US006791210B2

(12) United States Patent
Stevenson et al.

(10) Patent No.: US 6,791,210 B2
(45) Date of Patent: Sep. 14, 2004

(54) CYCLIC REGULATION APPARATUS, SYSTEM, AND METHOD

(75) Inventors: Paul E. Stevenson, Colorado Springs, CO (US); Jon E. Tourville, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/175,763

(22) Filed: Jun. 20, 2002

(65) Prior Publication Data

US 2003/0234637 A1 Dec. 25, 2003

(51) Int. Cl.[7] .................................................. H02M 3/06
(52) U.S. Cl. ........................ 307/109; 307/110; 320/166
(58) Field of Search ................................ 307/109, 110; 363/59, 60; 320/166–167

(56) References Cited

U.S. PATENT DOCUMENTS 5,568,035 A * 10/1996 Kato et al. .................. 320/166
6,317,343 B1 * 11/2001 Okamura et al. ............. 363/59
6,323,623 B1 * 11/2001 Someya et al. ............. 320/166
6,531,792 B2 * 3/2003 Oshio ......................... 307/109

* cited by examiner

*Primary Examiner*—Shawn Riley
(74) *Attorney, Agent, or Firm*—Schwegman, Lundberg, Woessner & Kluth, P.A.

(57) ABSTRACT

A power delivery apparatus, system may include a series-connected plurality of energy storage devices, a voltage sensor to sense a supply voltage across a load coupled to a selected one of the plurality of storage devices, and a switch to couple and decouple various ones of the series-connected plurality of energy storage devices from the load when the supply voltage is less than or equal to a reference voltage. An article, including a machine-accessible medium, capable of directing a machine to carry out a method of delivering power may include data which directs the machine to couple each one of a series-connected plurality of energy storage elements to a power source, couple a selected one of the plurality of storage elements to a load, discharge a selected amount of energy from the selected one of the series-connected plurality of storage elements into the load, and decouple the selected one of the series-connected plurality of storage elements from the load.

21 Claims, 6 Drawing Sheets

CYCLIC REGULATION APPARATUS, SYSTEM, AND METHOD

TECHNICAL FIELD

Embodiments of the present invention relate generally to apparatus and methods used for supplying power. More particularly, embodiments of the present invention relate to supplying power using switching circuitry with charge, voltage, and/or current sensing.

BACKGROUND INFORMATION

A familiar problem in system engineering is the subsystem having power requirements which are not met by the main supply. In such cases, the available supply rails are not directly usable. Battery voltage, when available, may also not be an option, due to a lack of space, safety concerns, reliability concerns, etc. Thus, voltage converters are often used to generate the desired voltage levels, and, as is well known to those skilled in the art, charge pumps are often the best choice when some combination of low power, simplicity, and low cost are required.

Charge-pump voltage converters usually make use of ceramic or electrolytic capacitors to store and transfer energy. Capacitive voltage conversion is achieved by periodically switching a capacitor. Passive diodes may perform this switching function in the simplest cases, provided an alternating voltage source is available. Otherwise, DC input voltage levels require the use of active switches which first charge a capacitor by connecting it across a voltage source. Later, the switches are used to connect the capacitor to the output or load in a way that produces a different voltage level.

Thus, most commonly available charge pump power supplies and DC-to-DC converters use switched capacitors for energy conversion, in conjunction with rectifiers, transistors, and/or integrated circuits. However, most DC—DC generators using external capacitors are sensitive to capacitance mismatch. Further, most regulators use an external clock or oscillator which switches capacitors in and out of the circuit whether or not the load demands it. Therefore, there is a need in the art for a regulator design which does not use a load-insensitive oscillator or clock to direct power transfer. Such a design might operate to reduce the amount of circuitry required to transfer power to a load, and eliminate unnecessary state changes, contributing to an increase in efficiency and/or a decrease in power consumption. There is also a need in the art for a regulator design which tolerates capacitor mismatch, further reducing manufacturing expense by allowing the purchase of capacitors with wider tolerance variations.

DESCRIPTION OF THE EMBODIMENTS OF THE INVENTION

Figure 1A:
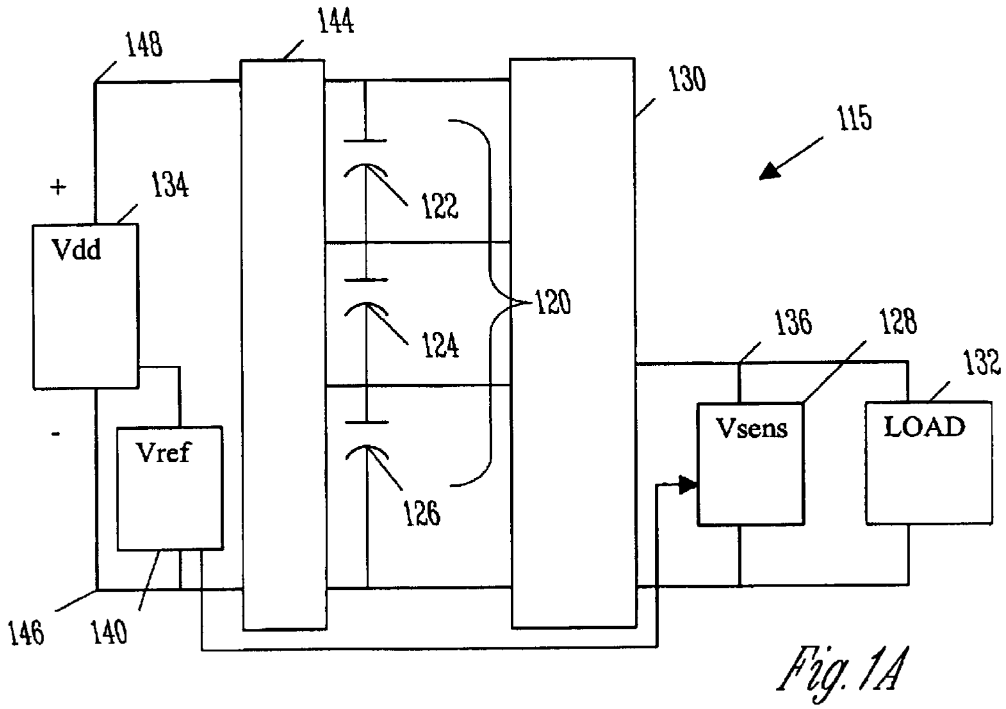
FIGS. 1A, 1B, and 1C are schematic diagrams illustrating various operating states of an apparatus according to an embodiment of the present invention.

In the following detailed description of embodiments of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to understand and implement them. Other embodiments may be utilized and derived therefrom, such that structural and logical substitutions and changes may be made without departing from the scope of the present disclosure. The following detailed description, therefore, is not to be taken in a limiting sense, and the scope of various embodiments of the invention is defined only by the appended claims, along with the full range of equivalents to which such claims are entitled.

Figure 1B:
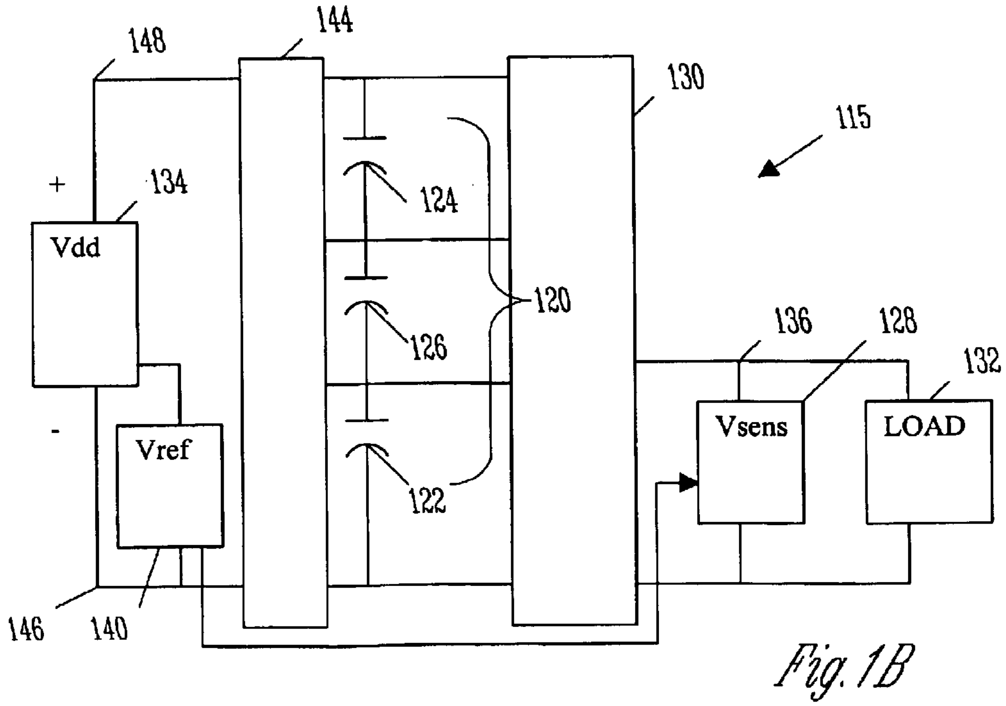
Figure 1C:
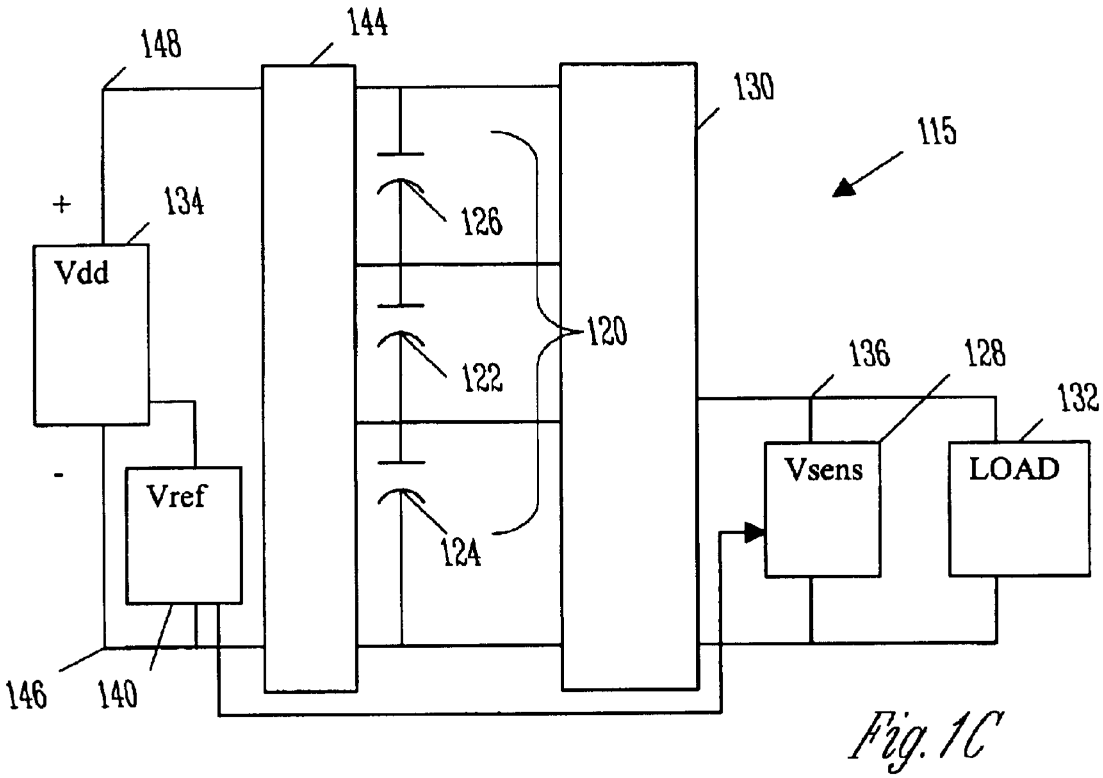

FIGS. 1A, 1B, and 1C are schematic diagrams illustrating various operating states of an apparatus according to an embodiment of the present invention. Referring now to FIG. 1A, in one embodiment, the apparatus 115 may include a series-connected plurality of energy storage devices 120, such as capacitors 122, 124, and 126; a voltage sensor 128, and a switch 130. The voltage sensor 128 is used to sense a supply voltage Vdd across a load 132 coupled to a selected one of the energy storage devices, such as capacitor 126. The switch 130 is used to couple and decouple each one of the series-connected plurality of energy storage devices 120 from the load 132, typically one at a time, in a serial fashion. Usually, one device is decoupled from the load, and another coupled to the load, when the voltage across the load (i.e., $V_{sense}$) is less than or equal to a selected reference voltage, $V_{ref}$.

As can be seen in the specific example of FIGS. 1A–1C, the apparatus 115 uses the series-connected plurality of energy storage devices 120, comprising a stack of "n" capacitors 122, 124, 126 to divide the supply voltage, Vdd, down to approximately Vdd/n. Thus, in FIG. 1A, $V_{sense}$ is initially approximately equal to Vdd/3. It should be noted however, that while all specific examples used herein discuss n=3, n is not limited to 3. The value of n may be any number from n=2 up to a practically unlimited number. Similarly, while capacitors are used to represent energy storage devices 120, any device capable of storing energy supplied by a power source, and discharging the stored energy to a load, may be used, including inductors, batteries, etc.

In FIG. 1A, three capacitors 122, 124, 126 have been connected in series across a supply 134. The load 132 is connected to the node 136 of the apparatus 115 which supplies a voltage approximately equal to Vdd/3. The exact value of the supply voltage at the node 136 will depend on the tolerance of the capacitors 122, 124, 126 and other factors. In some embodiments, the capacitors 122, 124, 126 are approximately the same size, or capacity, although it will be shown that the tolerances of the capacitors 122, 124, 126 do not need to be tightly controlled.

During operation of the apparatus 115, the load 132 pulls charge off of the capacitor 126 (i.e., capacitor 126 discharges into the load 132), reducing the voltage at the node 136. The voltage across the capacitors 122, 124 may rise to accommodate the drop in voltage across capacitor 126. This means that charge may flow into capacitors 122, 124. The amount of charge which flows into these capacitors may depend on the voltage drop at the node 136, the values or capacity of the capacitors 122, 124, 126, and the supply voltage magnitude Vdd.

Assume that the same amount of charge will flow into capacitors 122, 124 as capacitor 126 discharges. Let Δ be the charge that flows into the capacitor 126. It can be shown that if Qa is the initial charge on capacitor 122, having a capacity Ca, and Qb is the initial charge on capacitor 124, having a capacity of Cb, then:

$$\Delta = \frac{V_{ref} * Ca * Cb - Qa * Cb - Qb * Ca}{Ca + Cb}$$

Thus, in this example, the voltage across the capacitors 122, 124 increases, while the voltage across the capacitor 126 decreases. When enough charge has been transferred to the load 1232, a decision is made to switch or decouple the capacitor 126 from the load 132, and to switch or couple another capacitor with more charge (and a higher voltage) across the load 132. Typically, this occurs when the sensed voltage (i.e., $V_{sense}$) sensed by the voltage sensor 128 become less than or equal to a selected reference voltage (i.e., $V_{ref}$) provided by a voltage reference 140. This may cause a comparator, for example, to issue a signal causing the switch 130 to sequence connections, replacing the discharged capacitor 126 across the load 132 with the freshly-charged capacitor 122.

The next state of the apparatus can be seen in FIG. 1B. Here the capacitor 122 has been placed across the load 132, and begins to discharge. While the capacitor 122 discharges, charge flows into the capacitors 124, 126 to keep the total voltage drop across the plurality of energy storage devices 120 approximately equal to the supply voltage, Vdd. In this case, the capacitor 122 discharges into the load 132 until the voltage at the node 136 reaches the selected trip point (e.g., $V_{sense} \leftarrow V_{ref}$). The reference voltage may be set by resistively dividing the supply 134 with a high impedance resistance divider, or some other advantageous method. At this time, the switch 130 may operate to decouple the capacitor 122 from the load 132, and to couple the next capacitor 124 to the load 132.

The next state of the apparatus 115 is shown in FIG. 1C, wherein the capacitor 124 is coupled to the load 132. At this time, the capacitors 122, 126 are charged by the supply 134, and the capacitor 124 is discharged by the load 132, until the capacitors 122, 124, 126 are switched again, at which point the state of the apparatus is shown by FIG. 1A. Also shown in FIG. 1C is a second switch 144 which may be used to change one or more (e.g., a pair) of coupling connections 146, 148 from the voltage source 134 to the series-connected plurality of energy storage devices 120 when the switch 130 decouples a selected one of the series-connected plurality of energy storage devices 120 from the load 132.

Figure 2:
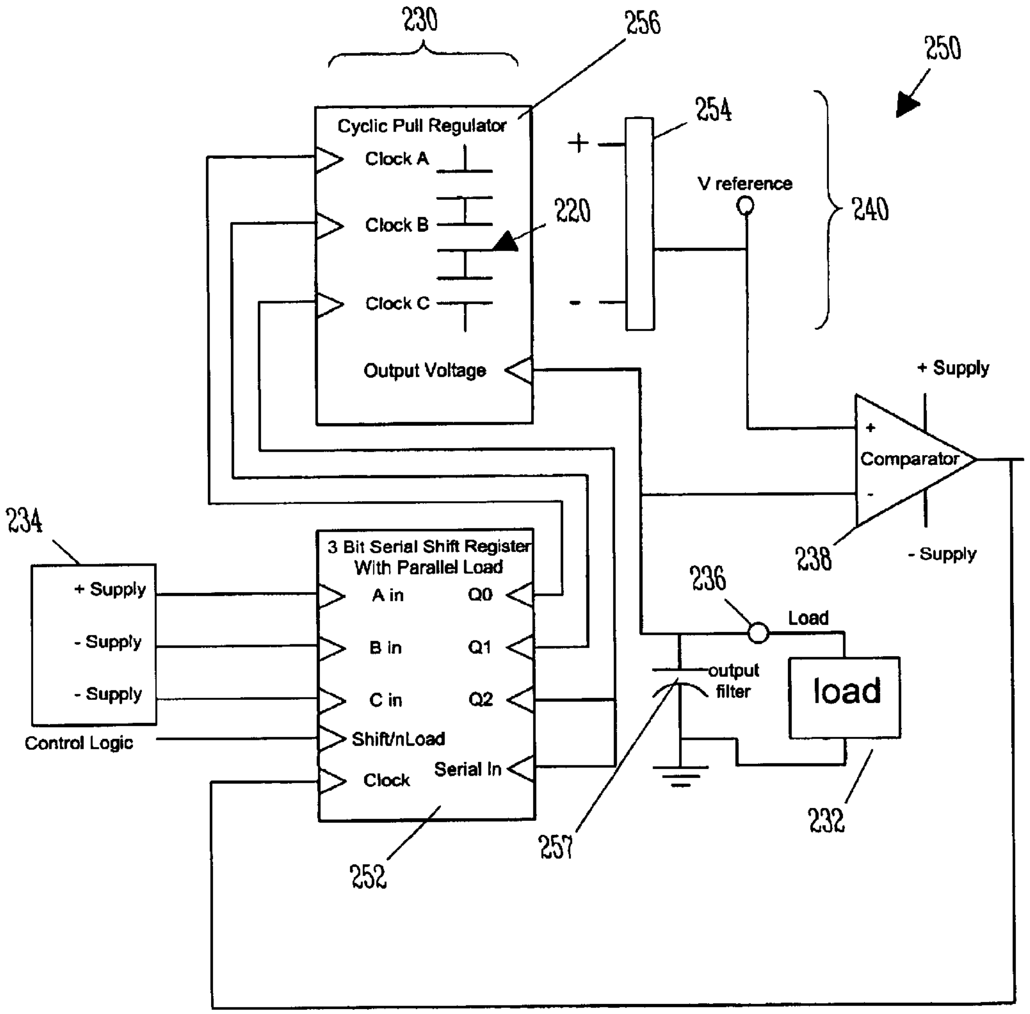
FIG. 2 is a block diagram of a system according to an embodiment of the present invention.

FIG. 2 is a block diagram of a system according to an embodiment of the present invention. The system 250 may include a voltage source 234 coupled to a series-connected plurality of energy storage devices 220, along with a voltage sensor 238 to sense the supply voltage $V_{load}$ across the load 232 (coupled to at least one of the series-connected plurality of energy storage devices 220). The system 250 may also include a switch 230 to decouple one of the series-connected plurality of energy storage devices 220 from the load 232, and to couple another one of the series-connected plurality of energy storage devices 220 to the load 232 when the supply voltage at the node 236 is less than the reference voltage $V_{ref}$.

Thus, the switch 230 may include a shift register 252. As noted previously, the system 250 may also include a resistive divider network 254 coupled to the voltage source 234 to provide the reference voltage $V_{ref}$. Also, as noted previously, with respect to any of the embodiments disclosed herein, the storage capacity of each one of the series-connected plurality of energy storage devices 220 may be within about +/−100% of a storage capacity of every other one of the series-connected plurality of energy storage devices 220. Preferably, the storage capacity of each one of the series-connected plurality of energy storage devices 220 is within about +/−10% of a storage capacity of every other one of the series-connected plurality of energy storage devices 220, as tighter controls on the tolerance will allow for reduced switching noise bandwidth. To facilitate the supply of power when energy storage devices 220 are coupled and decoupled from the load 232, a filter device 257 capable of being coupled to each one of the series-connected plurality of energy storage devices 220, such as a filter capacitor, may also be included in the system 250.

During operation, the system 250 can make use of the shift register 252 preloaded for switching. For example, the shift register may be loaded with Ain=1, Bin=0, and Cin=0. The voltage sensor 238 (e.g., a comparator) output clocks the register 252, such that every time the output voltage $V_{load}$ drops below $V_{ref}$ the sensor 238 output goes high. This causes the value in Q0 to go to Q1, the value in Q1 to go to Q2, and the value in Q2 to go to Q0. The result is that only one output Q0–Q2 of the register 252 is high at a time, and this high output is assumed in a sequential fashion. Negative logic may also be used such that only one output Q0–Q2 of the register 252 is low at a time; in this case the preload value would be "110", instead of "100".

Figure 3:
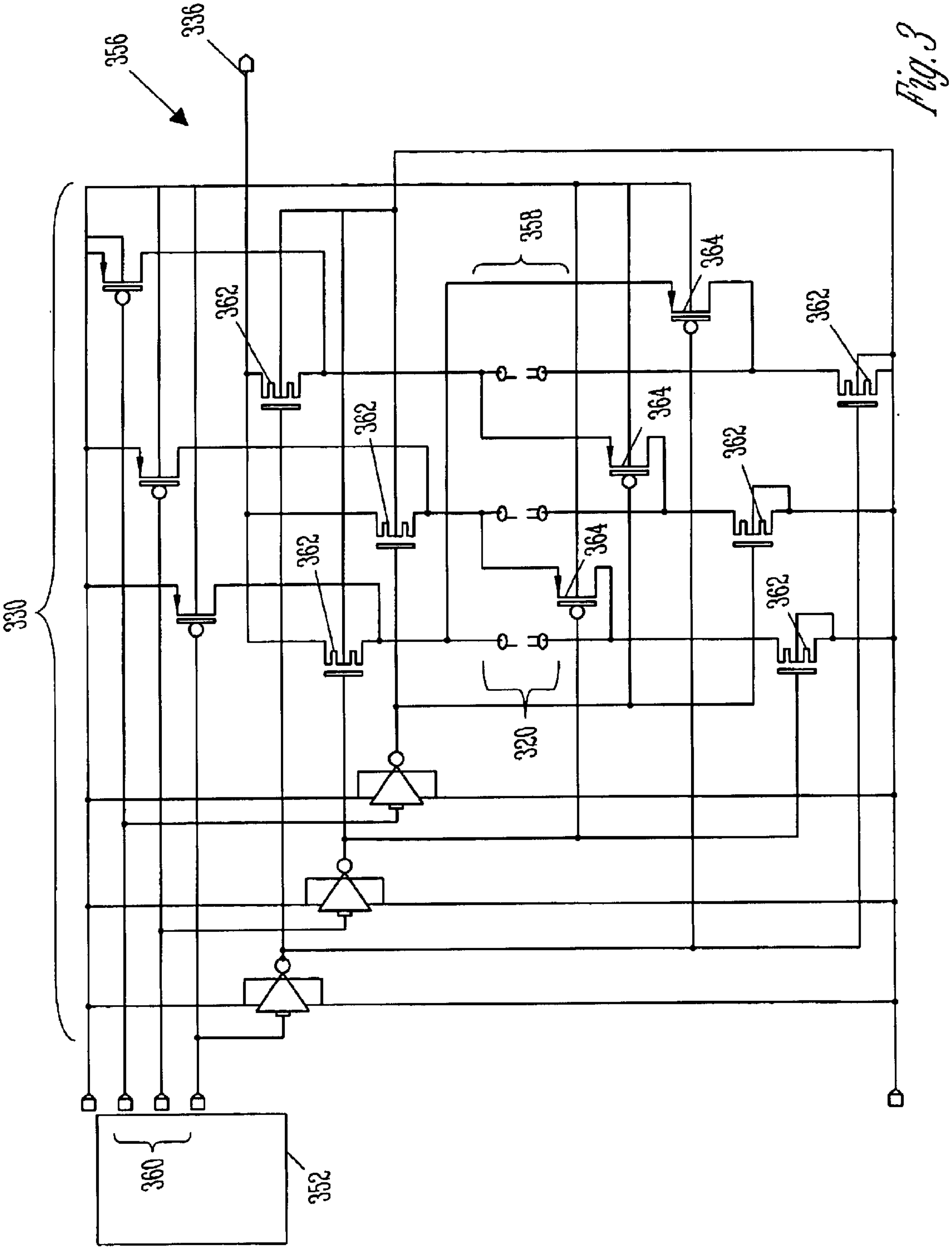
FIG. 3 is a schematic diagram of an apparatus according to an alternative embodiment of the invention.

A start-up circuit to bring $V_{load}$ up to a value of approximately Vdd/3 with the load disconnected is typically required, but not shown in FIG. 3, since start-up techniques are well known. It will also be realized that using a high resistance divider network 254 to set the value of $V_{ref}$ close to Vdd/n may reduce output supply voltage ripple.

The apparatus 115 (FIG. 1) and system 250 (FIG. 2) are quite tolerant of mismatch among the energy storage devices 220. For example, when simulations of the apparatus and system were effected, using a circuit having three capacitors for the energy storage devices, it was determined that even when all of the capacitors were within +/−50% tolerance of the average capacitance, and where one capacitor had twice the capacity of another, the output ripple rapidly converged to less than 5%, and the voltage output never fell below 0.80 volts using a reference voltage $V_{ref}$=0.99 volts, and a supply voltage=3.0 volts.

FIG. 3 is a schematic diagram of an apparatus according to an alternative embodiment of the invention. In this case, the regulator 357 (i.e., similar to or identical to the regulator 257 in FIG. 2) includes several nodes 358 (i.e., a_hi, a_lo, b_hi, b_lo, c_hi and c_lo) to connect energy storage devices, such as capacitors. Nodes 360 (i.e., a_source, b_source, and c_source) are inputs which may receive switching signals from a shift register, or other source of selection signals, such as a processor, to determine which of the devices connected to the nodes 358 will be coupled to the output node 336. This particular circuit configuration allows expansion to a number of storage devices which is greater than three (i.e., n>3), simply by increasing the number of device columns and corresponding input/output nodes 358, 360. Thus, it is easily seen how the switch 330 may include one or more transistors 362, such as field effect transistors, used to couple each one of the series-connected plurality of energy storage devices 320 to the output node 336. Other transistors 364, such as field effect transistors, may also be used to couple selected terminals 358 of the energy storage elements to other terminals 358 of the energy storage elements.

It should be noted that the apparatus 115; switches 130, 144, 230, 330; the voltage sensor 138, 238; the voltage reference 140, 240; and the registers 252, 352 may all be characterized as "modules" herein. Such modules may include hardware circuitry, such as a microprocessor and/or memory circuits, software program modules, and/or firmware, and combinations thereof, as directed by the architect of the apparatus 115 and system 250, and appropriate for particular implementations of various embodiments of the invention.

It should be understood that the apparatus 115 and system 250 of various embodiments of the present invention can be used in applications other than power supplies, and thus, the invention is not to be so limited. The illustrations of an apparatus 115 and a system 250 are intended to provide a general understanding of the structure of various embodiments of the present invention, and are not intended to serve as a complete description of all the elements and features of apparatus and systems which might make use of the structures described herein.

Applications which may include the novel apparatus and system of various embodiments of the present invention include electronic circuitry used in high-speed computers, communications and signal processing circuitry, processor modules, embedded processors, and application-specific modules, including multi-layer, multi-chip modules. Such apparatus and systems may further be included as subcomponents within a variety of electronic systems, such as televisions, cellular telephones, personal computers, radios, vehicles, and others.

Figure 4:
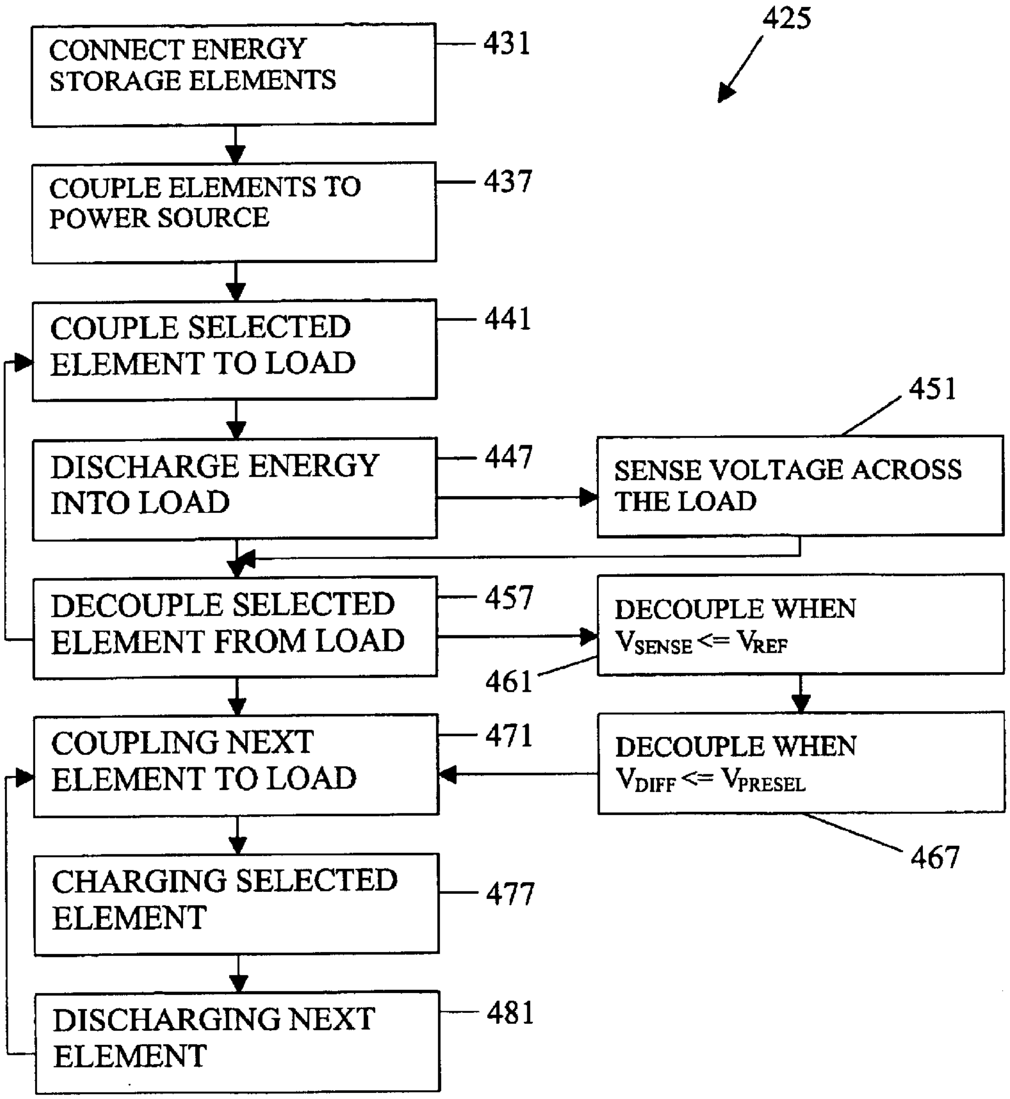
FIG. 4 illustrates a method of supplying power according to an embodiment of the present invention.

FIG. 4 illustrates a method of supplying power according to an embodiment of the present invention. The method 425 may include connecting a plurality of energy storage elements in series at block 431, coupling each one of the series-connected plurality of energy storage elements to a power source at block 437, coupling a selected one of the series-connected plurality of energy storage elements to a load at block 441, and discharging a selected amount of energy from the selected energy storage element into the load at block 447 (which may include sensing a voltage across the load at block 451).

The method 425 may also include decoupling the selected energy storage element from the load at block 457. As noted previously, decoupling the selected storage element may include determining that the voltage sensed across the load is less than or equal to some preselected reference voltage at block 461. Alternatively, decoupling the selected storage element may include determining that the difference between the voltage sensed across the load and the preselected reference voltage (i.e., $|V_{load}-V_{ref}|$) is less than or equal to some preselected value, $V_{presel}$, at block 467. This may occur, for example, when the difference is monitored to determine that $V_{ref}$ is approaching $V_{load}$ at some rate, using derivative calculations, for example.

The method 425 may terminate at block 457, or the method 425 may also include repeatedly coupling a selected one of the series-connected plurality of energy storage elements to the load; repeatedly discharging a selected amount of energy from the selected one of the series-connected plurality of energy storage elements into the load; and repeatedly decoupling the selected one of the series-connected plurality of energy storage elements from the load, as blocks 441, 447, and 457 are repeated. Alternatively, the method may continue with coupling a selected next one of the series-connected plurality of energy storage elements to the load at block 491, charging the selected one of the series-connected plurality of energy storage elements at block 477, and discharging a selected amount of energy from the selected next one of the series-connected plurality of energy storage elements into the load at block 481. The process including blocks 471, 477, and 481 may also be repeated.

It should be noted that while capacitors have been used as an example of energy storage elements herein, other mechanisms may also be used according to various embodiments of the invention, and therefore, the invention is not to be so limited. Similarly, switching may be effected using devices other than transistors and shift registers. Therefore, it should be clear that the some embodiments of the present invention may also be described in the context of computer-executable instructions, such as program modules, being executed by a computer. Generally, program modules may include routines, programs, objects, components, data structures, etc. that perform particular tasks or implement particular abstract data types.

Figure 5:
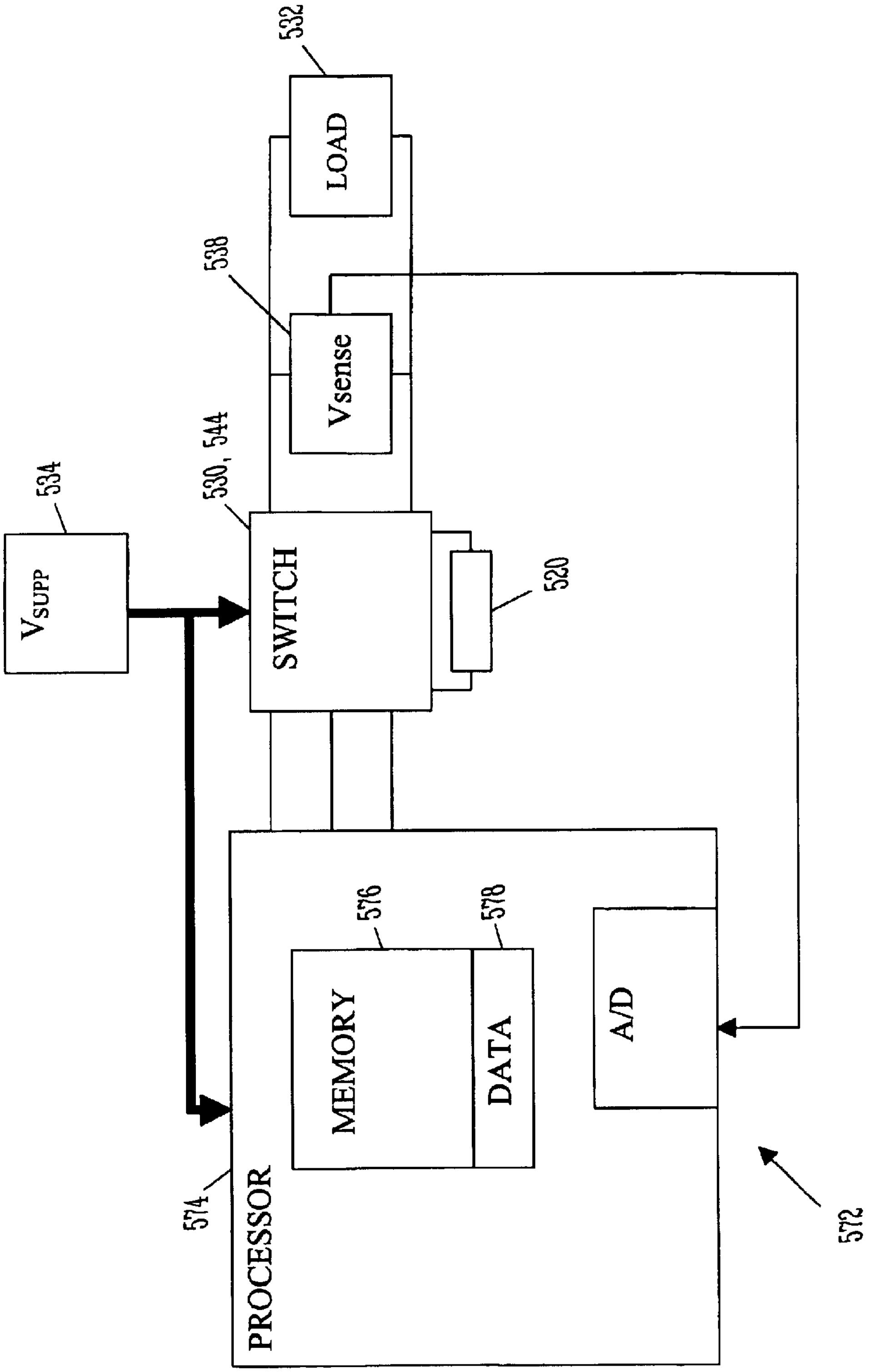
FIG. 5 is a block diagram of an article according to an embodiment of the present invention.

Thus, FIG. 5 illustrates an article 572 according to an embodiment of the invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientated format using an object-oriented language such as Java, Smalltalk, or C++. Alternatively, the programs can be structured in a procedure-orientated format using a procedural language, such as COBOL or C. The software components may communicate using any of a number of mechanisms that are well-known to those skilled in the art, such as Application Program Interfaces (APIs) or interprocess communication techniques. However, as will be appreciated by one of ordinary skill in the art upon reading this disclosure, the teachings of various embodiments of the present invention are not limited to any particular programming language or environment.

As is evident from the preceding description, the processor 574 typically accesses at least some form of computer-readable media, such as the memory 576. However, computer-readable and/or accessible media may be any available media that can be accessed by the apparatus 115, system 250, and processor 574. By way of example and not limitation, computer-readable media may comprise computer storage media and communications media. Computer storage media includes volatile and non-volatile, removable and non-removable media implemented using any method or technology for storage of information such as computer-readable instructions, data structures, program modules or other data. Communication media specifically embodies computer-readable instructions, data structures, program modules or other data present in a modulated data signal such as a carrier wave, coded information signal, and/or other transport mechanism, which includes any information delivery media. The term "modulated data signal" means a signal that has one or more of its characteristics set or changed in such a manner as to encode information in the signal. By way of example and not limitation, communications media also includes wired media such as a wired network or direct-wired connections, and wireless media such as acoustic, optical, radio frequency, infrared and other wireless media. Combinations of any of the above are also be included within the scope of computer-readable and/or accessible media.

Thus, referring to FIG. 5, it is now easily understood that another embodiment of the invention may include an article 572 comprising a machine-accessible medium 576 having associated data 578, wherein the data 578, when accessed, results in a machine (e.g. a processor 574 or computer) performing activities such as coupling (e.g., switching using one or more switches 530, 544) each one of a series-connected plurality of energy storage elements 520 to a power source 534, coupling a selected one of the series-connected plurality of energy storage elements 520 to a load 532, discharging a selected amount of energy from the selected one of the series-connected plurality of energy storage elements 520 into the load 532, and decoupling the selected one of the series-connected plurality of energy storage elements 520 from the load 532.

Examples of other activities performed by the machine may include coupling a selected next one of the series-connected plurality of energy storage elements 520 to the load 532, charging the selected energy storage element, discharging a selected amount of energy from the selected next one of the series-connected plurality of energy storage elements 520 into the load 532, and decoupling the selected energy storage element from the load 532 when a difference between a sensed voltage across the load and a reference voltage is less than or equal to a preselected amount (e.g., as determined by a voltage sensor 538). Those skilled in the art will realize that many other activities may be performed by the machine which come within the scope of various embodiments of the invention.

Thus, various embodiments of the invention may provide a mechanism for delivering power to a load without the use of a clocking mechanism, but rather, as the power requirements of the load dictate. Further, a large variation in energy storage element capacity may be tolerated while maintaining satisfactory operation. The combination of these features may render a power converter which is more efficient, uses less power, and costs less to manufacture.

Although specific embodiments have been illustrated and described herein, those of ordinary skill in the art will appreciate that any arrangement which is calculated to achieve the same purpose may be substituted for the specific embodiments shown. This disclosure is intended to cover any and all adaptations or variations of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of embodiments of the invention includes any other applications in which the above structures and methods are used. The scope of embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature of the technical disclosure. It is submitted with the understanding that it will not be used to interpret or limit the scope or meaning of the claims. In the foregoing Detailed Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

What is claimed is:

1. An apparatus, comprising:

a series-connected plurality of energy storage devices;

a voltage sensor to sense a supply voltage across a load coupled to a selected one of the series-connected plurality of energy storage devices; and a first switch to decouple the selected one of the series-connected plurality of energy storage devices from the load and to couple a selected other one of the series-connected plurality of energy storage devices to the load when the supply voltage is less than or equal to a reference voltage.

2. The apparatus of claim 1, wherein the selected other one of the series-connected plurality of energy storage devices is a selected next one in the series-connected plurality of energy storage devices.

3. The apparatus of claim 1, wherein the supply voltage is approximately equal to a voltage provided by a voltage source coupled to the series-connected plurality of energy storage devices divided by a number of energy storage devices comprising the series-connected plurality of energy storage devices.

4. The apparatus of claim 1, further comprising:

a second switch to couple a voltage source to the series-connected plurality of energy storage devices.

5. The apparatus of claim 4, wherein the second switch changes a pair of coupling connections to the series-connected plurality of energy storage devices when the first switch decouples the selected one of the series-connected plurality of energy storage devices from the load.

6. The apparatus of claim 1, wherein each one of the series-connected plurality of energy storage devices is a capacitor.

7. A system, comprising:

a voltage source;

a load;

a series-connected plurality of energy storage devices coupled to the voltage source;

a voltage sensor to sense a supply voltage across the load, wherein the load may be coupled to a selected one of the series-connected plurality of energy storage devices; and a switch to decouple the selected one of the series-connected plurality of energy storage devices from the load and to couple a selected other one of the series-connected plurality of energy storage devices to the load when the supply voltage is less than a reference voltage.

8. The system of claim 7, wherein the switch includes a shift register.

9. The system of claim 7, further comprising:

a resistive divider network coupled to the voltage source to provide the reference voltage.

10. The system of claim 7, wherein a storage capacity of each one of the series-connected plurality of energy storage devices is within about +/−100% of a storage capacity of every other one of the series-connected plurality of energy storage devices.

11. The system of claim 7, wherein the switch includes at least one field effect transistor coupled to each one of the series-connected plurality of energy storage devices.

12. The system of claim 7, further comprising:

a filter device capable of being coupled to each one of the series-connected plurality of energy storage devices.

13. A method, comprising:

coupling each one of a series-connected plurality of energy storage elements to a power source;

coupling a selected one of the series-connected plurality of energy storage elements to a load;

discharging a selected amount of energy from the selected one of the series-connected plurality of energy storage elements into the load; and decoupling the selected one of the series-connected plurality of energy storage elements from the load.

14. The method of claim 13, further comprising:

connecting the plurality of energy storage elements in series.

15. The method of claim 13, wherein discharging a selected amount of energy from the selected one of the series-connected plurality of energy storage elements into the load further comprises:

sensing a voltage across the load.

16. The method of claim 15, wherein decoupling the selected one of the series-connected plurality of energy storage elements from the load further comprises:

decoupling the selected one of the series-connected plurality of energy storage elements from the load when the sensed voltage is less than or equal to a reference voltage.

17. The method of claim 13, further comprising:

repeatedly coupling a selected one of the series-connected plurality of energy storage elements to the load;

repeatedly discharging a selected amount of energy from the selected one of the series-connected plurality of energy storage elements into the load; and repeatedly decoupling the selected one of the series-connected plurality of energy storage elements from the load.

18. An article comprising a machine-accessible medium having associated data, wherein the data, when accessed, results in a machine performing:

coupling each one of a series-connected plurality of energy storage elements to a power source;

coupling a selected one of the series-connected plurality of energy storage elements to a load;

discharging a selected amount of energy from the selected one of the series-connected plurality of energy storage elements into the load; and decoupling the selected one of the series-connected plurality of energy storage elements from the load.

19. The article of claim 18, wherein the machine-accessible medium further includes data, which when accessed by the machine, results in the machine performing:

coupling a selected next one of the series-connected plurality of energy storage elements to the load;

charging the selected one of the series-connected plurality of energy storage elements; and discharging a selected amount of energy from the selected next one of the series-connected plurality of energy storage elements into the load.

20. The article of claim 18, wherein a field effect transistor is used to couple a terminal of the selected next one of the series-connected plurality of energy storage elements to a terminal of the selected next one of the series-connected plurality of energy storage elements.

21. The article of claim 18, wherein the machine-accessible medium further includes data, which when accessed by the machine, results in the machine performing:

decoupling the selected one of the series-connected plurality of energy storage elements from the load when a difference between a sensed voltage across the load and a reference voltage is less than or equal to a preselected amount.

* * * * *